United States Patent Office 3,186,743
Patented June 1, 1965

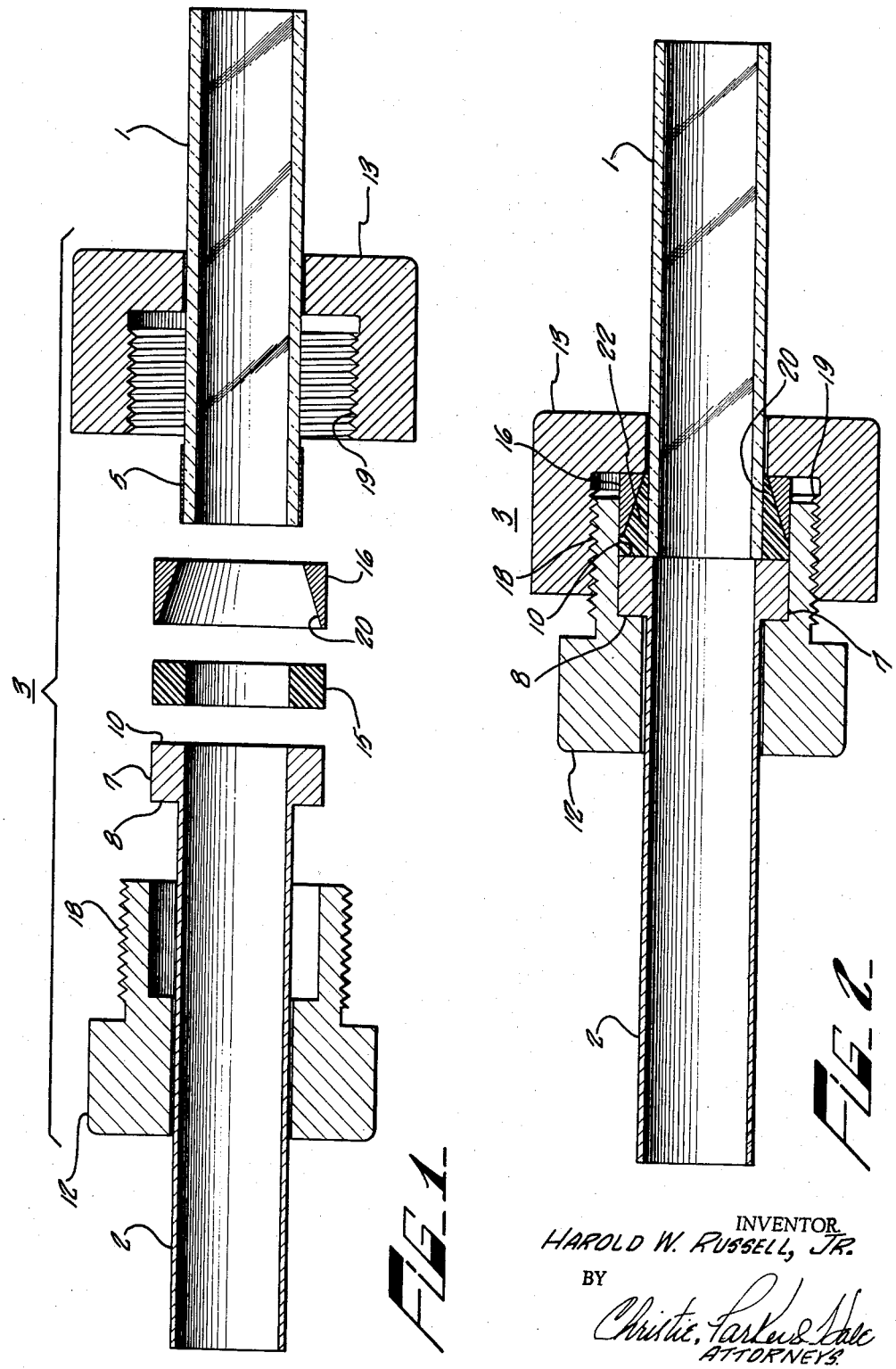

3,186,743
GLASS-TO-METAL TUBE COUPLING HAVING INDIUM SEAL MEANS
Harold W. Russell, Jr., Rochester, N.Y., assignor to Consolidated Vacuum Corporation, Rochester, N.Y., a corporation of New York
Filed Aug. 28, 1962, Ser. No. 219,913
2 Claims. (Cl. 285—238)

The subject invention relates to glass-to-metal seals and, more particularly, to a union for sealably joining glass members to metal members.

In the vacuum industry and related arts, it is frequently necessary to establish a vacuum-tight junction between a glass member and a metal member, such as a glass tube and a metal tube leading to a vacuum system.

One well-known method for making such glass-to-metal junctions resides in the joining of the glass member to the metal member by the application of glassblowing techniques which require the services of specialized personnel and, in order to be successful, normally depend on the presence, at the glass-to-metal junction, of a special metal alloy having a coefficient of thermal expansion closely similar to that of glass over a wide temperature range.

Another well-known method resides in the application of a gasket member, such as an elastomer seal, to the glass and metal members and the establishment of a sealed junction by means of compression fittings acting on such gasket member. While this method does not require the services of specialized glassblowers, it has the disadvantage that it results in seals which become deficient during prolonged use and introduce a relatively high gas load into the vacuum system due to the vapor pressure and outgassing characteristics of the gasket materials employed in these prior art methods.

The subject invention overcomes these disadvantages and provides a glass-to-metal union that is durable, does not appreciably contaminate the space confined by the glass and metal members and does not require the use of special alloys of the above-mentioned type and the services of highly skilled personnel for its application.

The invention resides in a selectively breakable vacuum-tight glass-to-metal seal union for joining a glass tube having a free end to an end portion of a metal tube. According to the invention, the end portion of the metal tube defines a projecting shoulder portion and a sealing surface facing in the direction of the glass tube and extending at right angles to the glass tube and the metal tube. The free end of the glass tube is coated with a metal selected from the group of indium and indium alloys. A compression ring member is slidably disposed on the glass tube and has a substantially frustoconical inner surface facing in the direction of the metal tube end portion and the coated end of the glass tube. A substantially annular gasket member comprising a metal selected from the group of indium and indium alloys is interposed between the metal tube end portion and the ring member so as to encompass the coated glass tube surface. A first tightening member is slidably movable on the metal tube into contact with the projecting shoulder portion and is selectively movable away from this shoulder portion. A second tightening member is slidably movable on the glass tube against the above mentioned ring member and is selectively movable away from this ring member. The first and second tightening members have corresponding threaded portions adapted to be brought into tightening engagement when the glass tube end is placed adjacent the metal tube end portion, and to be selectively untightened from each other when the seal union is to be broken.

The invention will become more readily apparent from the following detailed description of a preferred embodiment thereof, illustrated by way of example in the accompanying drawings in which:

FIG. 1 is an exploded, sectional side view, prior to assembly, of a preferred glass-to-metal seal union according to the invention; and FIG. 2 is a sectional side view of the seal union shown in FIG. 1, in the assembled state.

FIG. 1 shows a length of glass tube 1 and a length of metal tube 2 to be sealably joined together by a glass-to-metal seal union 3. At one end thereof, the glass tube 1 has applied thereto a coating 5 of indium or an indium alloy. This coating 5 extends around glass tube 1 and may be applied to glass tube 1 in any suitable manner, such as by means of a soldering device or by immersion of an end portion of glass tube 1 in a supply of molten indium or a molten indium alloy. This coating process is easily effected, since indium and indium-base alloys have relatively low melting points and also have the ability to "wet" glass. Prior to the application of coating 1, it is preferable that the surface of the glass tube 1 to be coated be thoroughly cleaned, such as by application of ultrasonic cleaning technique or a suitable cleaning fluid, so as to assure an intimate adherence of the coating 5 to the glass tube 1.

The metal tube 2 has an integral end portion 7 defining a shoulder portion 8 and a sealing surface 10.

The seal union 3 comprises a pair of corresponding tigtening or nut members 12 and 13, a gasket member 15, and a compression ring member 16.

Tightening member 12 is slidably disposed on metal tube 2 and has an external screw thread 18. Tightening member 13 is slidably disposed on glass tube 1 and has an internal thread 19 corresponding to the external thread 18 of tightening member 12. Gasket member 15 is substantially annularly shaped and is comprised of indium or an indium alloy.

Compression ring member 16 has a frustoconical inner surface 20.

During assembly of seal union 3, the tubes 1 and 2 are positioned with their corresponding ends in abutting engagement. The annular gasket member 15 is positioned so that it encompasses coating 5 and is adjacent to sealing surface 10 defined on metal tube end portion 7. Compression ring member 16 is positioned so that its frustoconical inner surface 20 faces gasket member 15. Tightening member 12 and 13 are then slid towards each other and the screw threads 18 and 19 thereof are brought into mutual engagement by rotating one of the tightening members relative to the other one. This relative rotation is continued, whereupon tightening member 12 will contact shoulder portion 8 on metal tube 2 and tightening member 13 will contact compression ring member 16 and force it onto gasket member 15. Due to this tightening action and the presence of frustoconical inner surface 20 on compression ring member 16, the material of gasket member 15 will be compressed into intimate contact with coating 5 on glass tube 1 and sealing surface 10 on metal tube end portion 7. Preferably, the tightening action is continued until the material of gasket member 15 cold welds to the coating 5 on glass tube 1, so that coating 5 and gasket member 15 forms an integral mass of sealing material, as shown at 22 in FIG. 2, which illustrates tubes 1 and 2 and the parts of sealing union 3 after completion of the tightening process just described. It has been found that this tightening process, due to the use of indium or an indium alloy for gasket member 15, will also result in a cold welding of sealing mass 22 to sealing surface 10 on metal tube end portion 7 and to frustoconical surface 20 of compression ring 16, so that an impenetrable and highly reliable seal is formed for tube 1 and 2. During operation, contamination of the evacuated space within tubes 1 and 2 is avoided by the above-mentioned use of indium and indium alloys which have a vapor pressure of as little as about $1 \times 10^{-14}$ torr at room temperature.

If desired, the seal union 3 may easily be broken by disconnecting tightening members 12 and 13 from each other and pulling the tubes 1 and 2 apart, so that sealing mass 22 will break loose from sealing surface 10. Sealing mass 22 may then be removed from glass tube 1 by the application of heat and the compression ring 16 and glass tube 1 may be cleaned prior to application of a fresh coating 5 to glass tube 1 and insertion of a fresh gasket member 15 into seal union 3. In many instances, sealing mass 22 may, however, be used several times before replacement thereof will become necessary.

While the use of pure indium for gasket member 15 and coating 5 results in excellent seals, indium alloys may also be used, as has already been indicated. In such alloys, the indium component should preferably be 50% or higher, even though satisfactory seals have been obtained with alloys having lower indium concentrations. Other materials in such indium alloys may be silver, tin or lead, for example, or combinations thereof.

While the drawings show glass and metal tubes, it should be understood that the invention is also applicable to seal unions for glass and metal members which have a different configuration, as long as this configuration is such as to permit the application of the concepts of the subject invention.

It should, of course, also be understood that the application of the subject invention is not necessarily restricted to use in connection with vacuum or evacuating systems, even though the invention has been described with the requirements of such systems in mind.

In addition, various applications and variations within the scope of the subject invention will be apparent to those skilled in the art.

I claim:

1. A selectively breakable vacuum tight glass-to-metal seal union comprising a glass tube having a free end and a predetermined portion of its peripheral surface adjacent said free end coated with a metal selected from the group of indium and indium alloys, a metal tube having an end portion defining a projecting shoulder portion and defining a sealing surface facing in the direction of said glass tube and extending at right angles to said glass tube and said metal tube, a compression ring member being slidably disposed on said glass tube and having a substantially frustoconical inner surface facing in the direction of said metal tube end portion and the coated glass tube end, a substantially annular gasket member comprising a metal selected from the group of indium and indium alloys and being interposed between said metal tube end portion and said ring member so as to encompass said coated glass tube end, a first tightening member slidably movable on said metal tube into contact with said projecting shoulder portion and selectively movable away from said shoulder portion, and a second tightening member slidably movable on said glass tube against said ring member and selectively movable away from said ring member, said first and second tightening members having corresponding threaded portions adapted to be brought into tightening engagement when said glass tube end is placed adjacent to said metal tube end portion, and to be selectively untightened from each other when said seal union is to be broken.

2. A selectively breakable, vacuum tight glass-to-metal seal union as claimed in claim 1, wherein said indium alloys contain at least 50% by weight of indium.

References Cited by the Examiner
UNITED STATES PATENTS

| | | | |
|---|---|---|---|
| 498,876 | 6/93 | Bells | 285—353 |
| 538,634 | 4/95 | Witham | 285—348 |
| 853,515 | 5/07 | Lyons | 285—348 |
| 2,567,113 | 9/51 | Kristensen | 285—353 |
| 2,671,746 | 3/54 | Brew | 29—470.1 |
| 2,965,962 | 12/60 | Ollendorf | 29—470.1 |
| 3,041,718 | 7/62 | Stuchbery | 29—470.1 |
| 3,065,000 | 11/62 | Stanton | 285—348 |
| 3,090,116 | 5/63 | Burgess | 29—470.1 |
| 3,109,225 | 11/63 | Wright | 29—470.1 |

CARL W. TOMLIN, *Primary Examiner.*